United States Patent
Hicks

(10) Patent No.: US 7,196,741 B2
(45) Date of Patent: Mar. 27, 2007

(54) AUTOMATIC IMAGE CONVERGENCE FOR PROJECTION TELEVISION SYSTEMS

(75) Inventor: James E. Hicks, Laguna Beach, CA (US)

(73) Assignee: Mitsubishi Digital Electronics America, Inc., Irvine, CA (US)

( * ) Notice: Subject to any disclaimer, the term of this patent is extended or adjusted under 35 U.S.C. 154(b) by 530 days.

(21) Appl. No.: 10/686,747

(22) Filed: Oct. 15, 2003

(65) Prior Publication Data
US 2005/0179825 A1    Aug. 18, 2005

(51) Int. Cl.
*H04N 3/22* (2006.01)

(52) U.S. Cl. .................. 348/745; 348/189; 359/456

(58) Field of Classification Search ........ 348/745–747, 348/189, 190, 805–807; 353/69, 70, 30, 353/31, 122; 359/456, 457
See application file for complete search history.

(56) References Cited

U.S. PATENT DOCUMENTS

| | | | |
|---|---|---|---|
| 4,485,394 A | | 11/1984 | Ghaem-Maghami et al. |
| 4,593,308 A | | 6/1986 | Kemplin |
| 5,196,960 A | * | 3/1993 | Matsuzaki et al. ........... 359/453 |
| 5,231,481 A | * | 7/1993 | Eouzan et al. ............... 348/658 |
| 5,337,179 A | * | 8/1994 | Hodges ....................... 359/443 |
| 5,345,262 A | | 9/1994 | Yee et al. |
| 5,475,447 A | * | 12/1995 | Funado ........................ 348/745 |
| 5,497,054 A | | 3/1996 | Ryu |
| 5,803,570 A | * | 9/1998 | Chen et al. .................. 353/122 |
| 5,898,465 A | | 4/1999 | Kawashima et al. |
| 6,219,011 B1 | * | 4/2001 | Aloni et al. .................. 345/1.3 |
| 6,422,704 B1 | * | 7/2002 | Gyoten et al. ............... 353/122 |
| 6,483,555 B1 | * | 11/2002 | Thielemans et al. ........ 348/745 |
| 2003/0123031 A1 | * | 7/2003 | Nelson et al. ................ 353/31 |
| 2005/0068466 A1 | * | 3/2005 | Waters et al. ................ 348/745 |

\* cited by examiner

*Primary Examiner*—Victor R. Kostak
(74) *Attorney, Agent, or Firm*—Orrick, Herrington & Sutcliffe LLP

(57) ABSTRACT

Systems and methods that facilitate automatic convergence and geometry alignment in projection systems such as a PTV. The automatic convergence system (ACS) preferably includes a CCD camera mounted inside the PTV and focused on the entire inside of a projection screen Fresnel lens. Alternatively, the ACS may include a deployable reflective sheet, preferably in the form of a roll up screen. In operation, signals from the CCD camera corresponding to test patterns projected onto the Fresnel lens or reflective sheet are analyzed and used to align, center or steer raster patterns to compensate for convergence error at a particular location. In a convergence mode, the video is blanked and then successive monochrome video test patterns are projected on the screen. The images captured by the CCD camera are used to memorize the location of landing points of one color test pattern from one of the projection units and then to align the other color patterns from the other projection units to the same landing points as the first color pattern. In a geometry alignment mode, the difference in brightness between an image striking the Fresnel screen and the over scanned area of the PTV cabinet is used to determine the border of the screen. This information is then used to provide reference marks for all geometrical adjustments done automatically using a similar process of successive test patterns and analysis.

12 Claims, 6 Drawing Sheets

AUTOMATIC IMAGE CONVERGENCE FOR PROJECTION TELEVISION SYSTEMS

FIELD OF THE INVENTION

The invention relates generally to projection television systems and more particularly to systems and methods for automatic image convergence.

BACKGROUND INFORMATION

Projection television (PTV) systems and the like typically employ three separate cathode ray tube (CRT) projection units that project the image of each CRT to a common area of a projection screen superimposing the three separate monochromatic color images on one another to provide a single multi-color image. Precise superposition of the three different color images is essential in such a system to avoid degraded resolution and rough, blurred composite images. Thus, the projection units must be adjusted to maintain convergence of the images over the visible surface of the screen. These adjustments are initially made at the factory, but with age, temperature and other environmental conditions, it is often necessary to readjust the convergence in the field in order to maintain the quality of the image on the screen.

Various types of convergence systems, both manual and automated, have been developed to handle the necessary convergence adjustments. Manual convergence systems tend to be labor intensive, tedious and extremely time consuming, requiring hours to complete. Because the manipulator must often have technical knowledge or training sufficient to execute the manual convergence corrections, abilities that ordinary PTV purchasers seldom possess, manual convergence correction is typically accomplished by a skilled technician. In addition, because the manual procedure often requires the use of special test instruments, it may require the inconvenience of removing the PTV from the purchaser's home so that the adjustment can be made at a repair shop Although automated convergence systems tend to avoid the disadvantages associated with manual systems, they too have their limitations with respect to accuracy, speed, reliability and expense. One example of an automated convergence system includes the use of a mechanically scanning optical head-that samples certain predetermined areas of a projected test pattern. The various mechanical elements and motors of such a system tend to add to its cost and complexity while detracting from system reliability. In addition, convergence accuracy tends to be dependent on motor accuracy and the process still tends to require several minutes to complete.

Another example of an automated convergence system includes the use of a series of photocells positioned at the edges of the projection screen to detect the size of successively projected test patterns. Such systems tend to only converge the very edges of the projection screen where the sensors are located. Often the middle of the screen, which is the most important area to the viewer, tends to be poorly aligned as a result.

Accordingly, it would be desirable to provide an inexpensive automated convergence system that accurately and reliably achieves convergence over the entire screen without increasing the mechanical complexity of the system.

SUMMARY

The present invention is directed to systems and methods that facilitate automatic convergence and geometry alignment in projection systems such as a CRT projection television (PTV) and the like, and other projection television and display systems. In a preferred embodiment, the automatic convergence system (ACS) of the present invention includes a charge coupled device (CCD) camera mounted inside the light box of a PTV at a position that allows it to focus on all areas of the inside of a Fresnel lens of a projection screen assembly and over-scanned regions of the PTV. Most of the light impinging on the rear of the Fresnel lens passes through to be viewed, but the CCD camera is able to detect the smaller amount of reflected light. Alternatively, the ACS may include a deployable reflective sheet, preferably in the form of a roll up screen. In operation, signals from the CCD camera corresponding to test patterns projected onto the Fresnel lens or reflective sheet are analyzed by a logic unit such as a microprocessor, CPU, computer and the like, running automatic convergence software. The logic unit uses the camera data to instruct a convergence/alignment controller to align, center or steer raster patterns to compensate for convergence error at a particular location.

The PTV can be sent into convergence or geometry alignment modes by entering the menu system of the PTV, or automatically by schedule or by detection of changes known to affect convergence such as being jarred or changes in temperature or humidity. In the convergence alignment mode, the microprocessor blanks the video on the projection screen and then applies successive monochrome video test patterns. The microprocessor then uses the image captured by the CCD camera to memorize the location of landing points of the color test pattern from one of a plurality of projection units, and then will change to a different color test pattern from another projection unit and use the CCD camera data to instruct the convergence/alignment controller to align or provide a readout to an operator to make a mechanical adjustment to align the other color patterns to the same landing points as the first color pattern.

In the geometry alignment mode, the difference in brightness between the image that strikes the inside of the Fresnel screen and the over scanned image that strikes the inside of the PTV cabinet is used to determine the border of the screen. This information is then used by the microprocessor to provide reference marks for all geometrical adjustments done automatically using a similar process of successive test patterns and microprocessor analysis.

Other systems, methods, features and advantages of the invention will be or will become apparent to one with skill in the art upon examination of the following figures and detailed description.

BRIEF DESCRIPTION OF THE FIGURES

The details of the invention, including fabrication, structure and operation, may be gleaned in part by study of the accompanying figures, in which like reference numerals refer to like parts. The components in the figures are not necessarily to scale, emphasis instead being placed upon illustrating the principles of the invention. Moreover, all illustrations are intended to convey concepts, where relative sizes, shapes and other detailed attributes may be illustrated schematically rather than literally or precisely.

DETAILED DESCRIPTION

The systems and methods described herein provide for automatically aligning convergence and geometry in projection systems such as a CRT projection television (PTV) and the like, and other projection television and display systems. More particularly, the automatic convergence system of the present invention preferably includes a charge coupled device (CCD) camera, preferably a monochrome CCD camera, mounted inside the light box of the PTV. The CCD camera is preferably located in a position that allows it to focus on all areas of the inside of a Fresnel lens of a projection screen assembly and over-scanned regions of the PTV. The translucent properties of the Fresnel lens are such that an image projected from the front of the projection screen also appears or is reflected on the inside of the Fresnel lens where it can be captured by the CCD camera. In operation, signals from the CCD camera corresponding to test patterns projected onto the Fresnel lens are analyzed by a logic unit such as a microprocessor, CPU, computer and the like, running automatic convergence software. The microprocessor uses the camera data to instruct a convergence/alignment controller to align, center or steer raster patterns to compensate for convergence error at a particular location. In an alternative embodiment, the controller may provide a readout instructing an operator to make mechanical adjustments.

The PTV can be sent into convergence or geometric alignment mode manually by entering the menu system of the PTV or automatically by schedule or by detection of changes known to affect convergence such as being jarred or changes in temperature or humidity in the field or in the factory. In the alignment mode, the microprocessor blanks the video on the projection screen and then applies successive monochrome video test patterns. The microprocessor will use the image captured by the CCD camera to memorize the location of landing points of one color test pattern from one of a plurality of projection unit, then change to a different color test pattern from another projection unit and use the CCD camera data to instruct the convergence circuitry to align the other color patterns to the same landing points as the first color pattern.

In the linearity or geometry alignment mode, the difference in brightness between an image that strikes the inside of the Fresnel screen and an over scanned image that strikes the inside of the PTV cabinet is used to determine the border of the screen. This information is then used by the microprocessor to provide reference marks for all geometrical adjustments done automatically using a similar process of successive test patterns and microprocessor analysis. As geometry changes in the field are not readily discernable by the viewer, this embodiment will be most useful in the initial alignment process in the factory.

Figure 1:
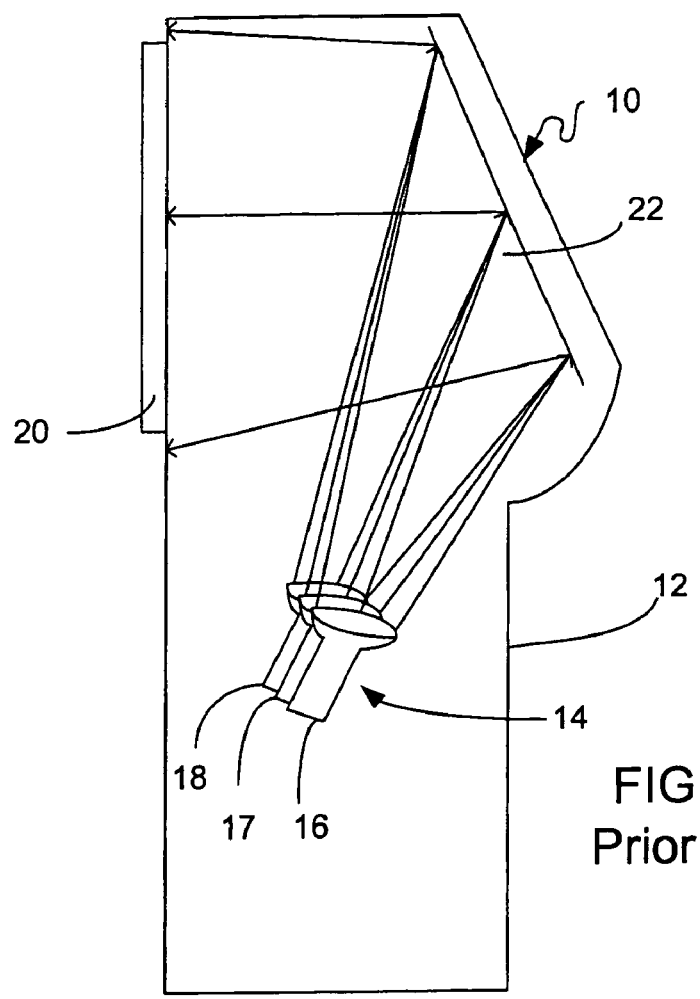
FIG. 1 depicts a side view of a projection television system of the prior art.
Figure 2:
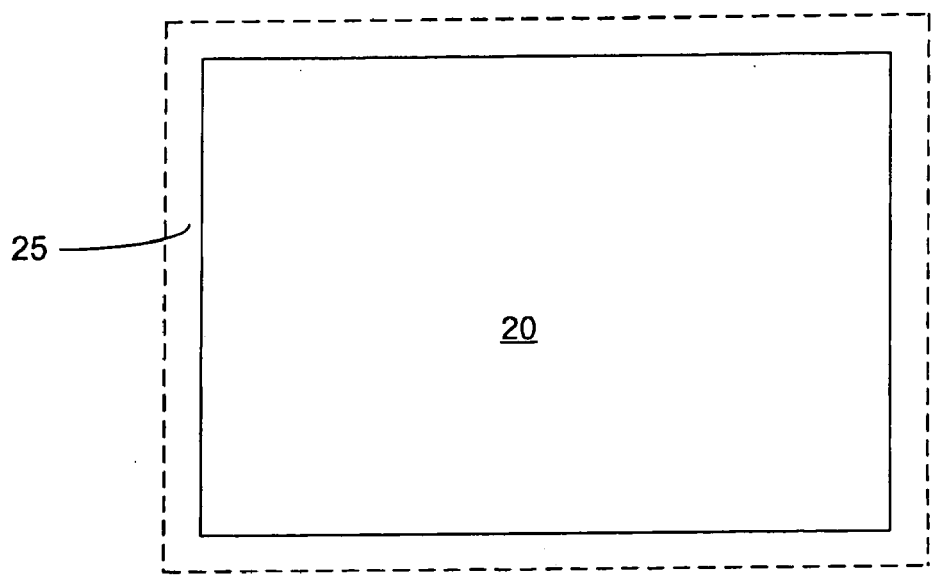
FIG. 2 depicts a plan view of a projection screen of a projection television system and the typical over scan area of a projection television system.

Turning in detail to the figures, FIG. 1 depicts a conventional CRT-based PTV 10 comprising a cabinet or enclosure 12, an image projection system 14 that includes three CRTs 16, 17 and 18 corresponding to three separate colors—red, green and blue—mounted in the cabinet, a projection screen 20 attached to the front of the cabinet 12, and a mirror 22 mounted in the interior of the cabinet 12 and optically coupled to the projection screen 20 and the image projection system 14. As depicted in FIGS. 1 and 2, all PTVs typically have an over-scanned area 25 onto which an image is projected beyond the borders of a screen 20.

Figure 3A:
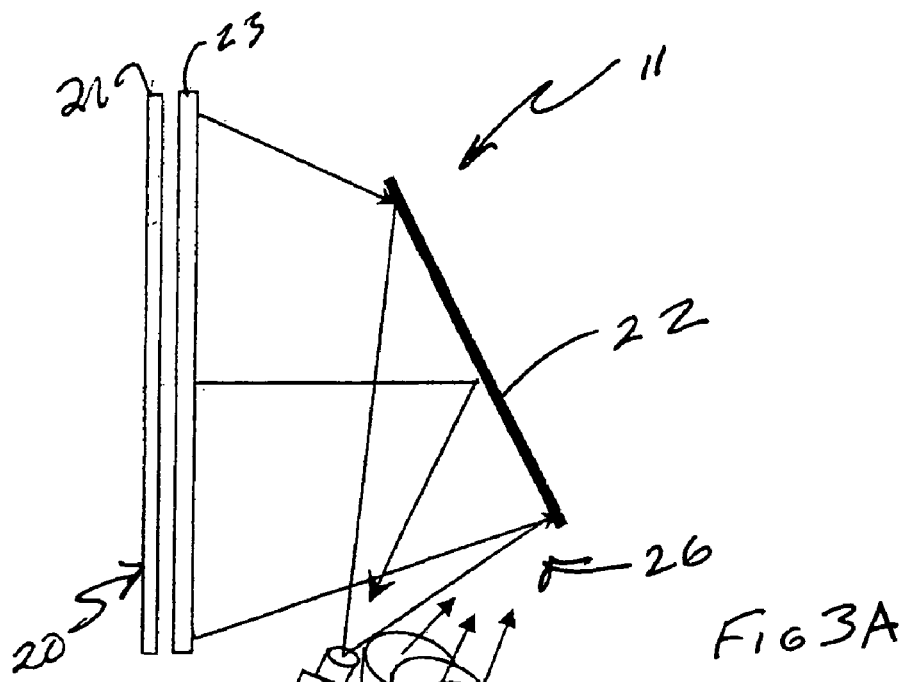
FIG. 3a depicts a side view of a projection television system including a preferred embodiment of an automatic convergence system of the present invention.

Referring to FIG. 3a, a CRT-based PTV system 11 comprising an automatic convergence system of the present invention is shown. More particularly, the PTV system 11 comprises an image projection system 14 including three projection units or CRTs 16, 17 and 18, a projection screen assembly 20 and a mirror 22 coupled to the projection system 14 and the projection screen assembly 20. The projection screen assembly 20 preferably includes a Fresnel lens 23 interiorly coupled with a lenticular screen 21. The auto convergence system preferably includes a CCD camera 42 mounted within the light box 26 of the PTV. As depicted, the CCD camera 42 is preferably positioned to allow it to focus on all areas of the inside of the Fresnel lens 23 and also the over scanned area 25 (FIG. 2) beyond the border of the Fresnel lens 23.

Figure 3B:
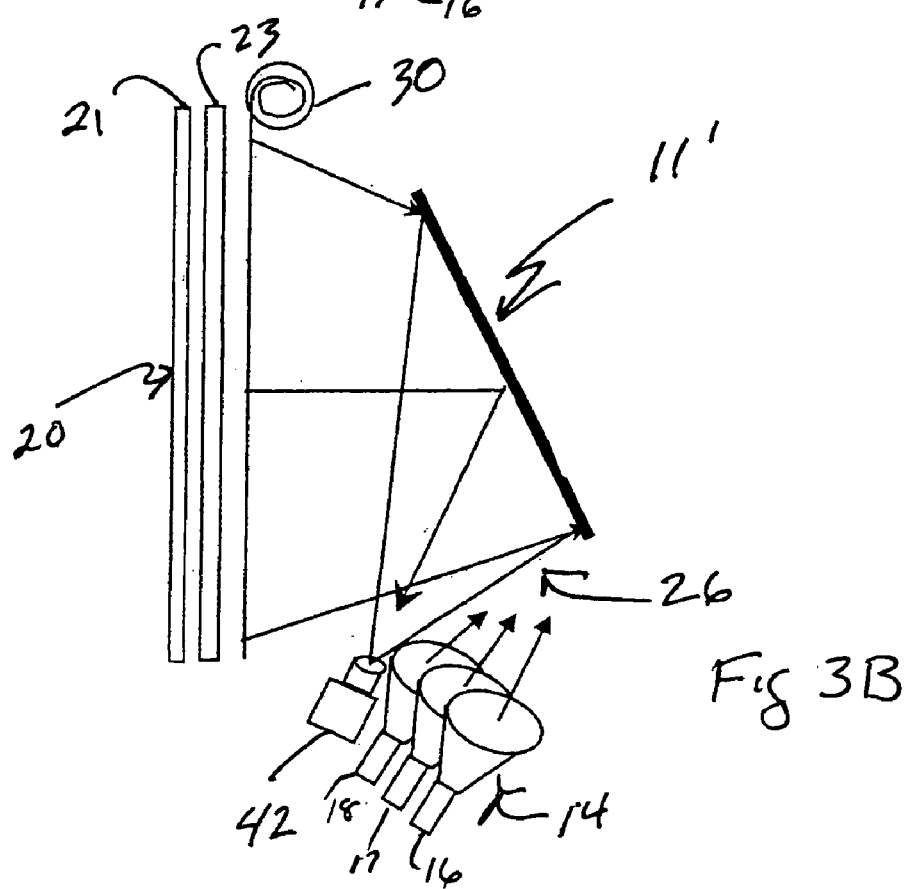
FIG. 3b depicts a side view of a projection television system including another preferred embodiment of an automatic convergence system of the present invention.

Although the translucent properties of the Fresnel lens 23 are such that an image projected from the front of the projection screen also appears on or is reflected by the inside of the Fresnel lens 23, an alternate embodiment of an automatic convergence system of the present invention is shown in FIG. 3b to include a reflective sheet 30 that is deployable in front of the Fresnel lens during the automatic convergence process. The PTV system 11', as depicted in FIG. 3a similarly comprises an image projection system 14 including three CRTs 16, 17 and 18, a projection screen assembly 20 and a mirror coupled to the projection system 14 and the projection screen assembly 20, which comprises a Fresnel lens 23 interiorly coupled with a lenticular screen 21. A CCD camera 42 mounted within the light box 26 of the PTV 11' is preferably positioned to allow it to focus on all areas of the deployable reflective sheet 30. As depicted, the reflective sheet 30 is a roll-up screen, but may be deployable in any suitable manner.

Figure 4A:
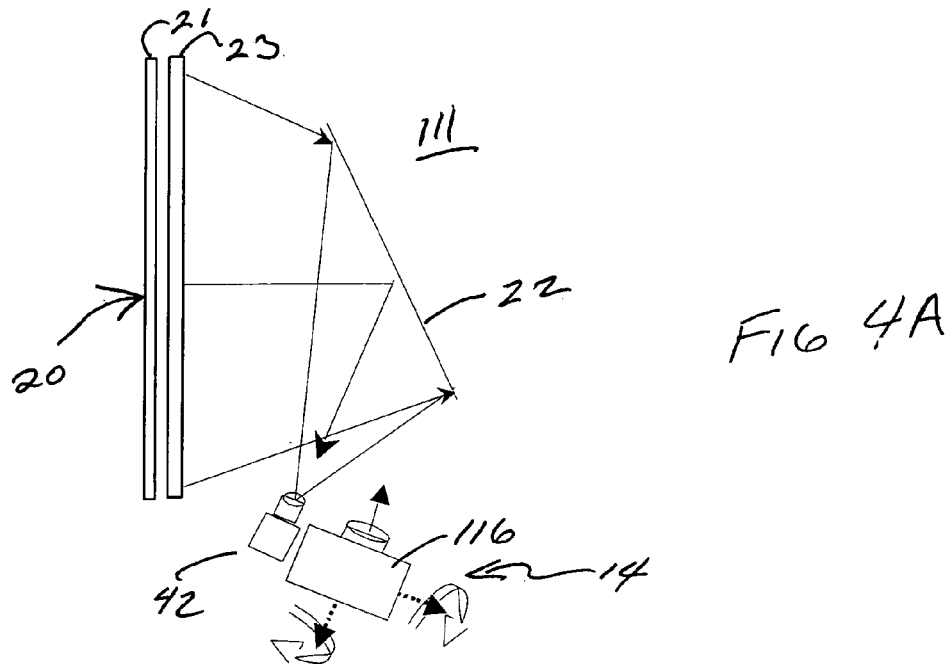
FIG. 4a depicts a side view of a projection television system including another preferred embodiment of an automatic convergence system of the present invention.
Figure 4B:
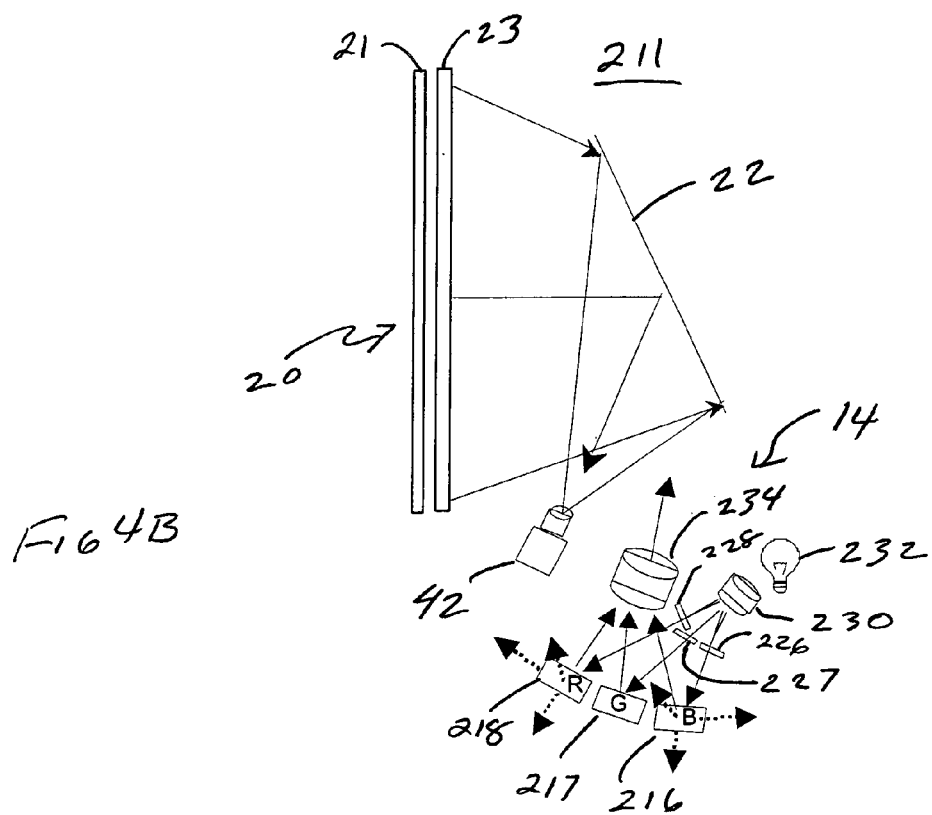
FIG. 4b depicts a side view of a projection television system including another preferred embodiment of an automatic convergence system of the present invention.

FIGS. 4a and 4b provide additional alternative embodiments comprising single and multi-chip digital projection display systems. Referring to FIG. 4a, a PTV system 111 comprises an image projection system 14 including a digital light box 116 comprising a light source, display chip and projection lens, a projection screen assembly 20 and a mirror coupled to the projection system 14 and the projection screen assembly 20. The light box preferably includes a servomotor or other electro-mechanical positioning device coupled thereto. The projection screen assembly 20 preferably includes a Fresnel lens 23 interiorly coupled with a lenticular screen 21. The auto convergence system preferably includes a CCD camera 42 mounted within the light box 26 of the PTV. As depicted, the CCD camera 42 is preferably positioned to allow it to focus on all areas of the inside of the Fresnel lens 23 and also the over-scanned area 25 (FIG. 2) beyond the border of the Fresnel lens 23.

Referring to FIG. 4b, a PTV system 211 comprises an image projection system 14 including a digital light box comprising a light source 232, red, green and blue filters 228, 227 and 226, red, green and blue display chips, 218, 217 and 216, a lens 230 coupling the light source 232 to the filters and chips, and a lens 234 coupling the chips to the rest of the system, a projection screen assembly 20, and a mirror 22 coupled to the projection system 14 and the projection assembly 20. Servo motors or other electromechanical positioning devices are preferably coupled to each chip. The projection screen assembly 20 preferably includes a Fresnel lens 23 interiorly coupled with a lenticular screen 21. The auto convergence system preferably includes a CCD camera 42 mounted within the light box 26 of the PTV. As depicted, the CCD camera 42 is preferably positioned to allow it to focus on all areas of the inside of the Fresnel lens 23 and also the over-scanned area 25 (FIG. 2) beyond the border of the Fresnel lens 23.

Figure 5:
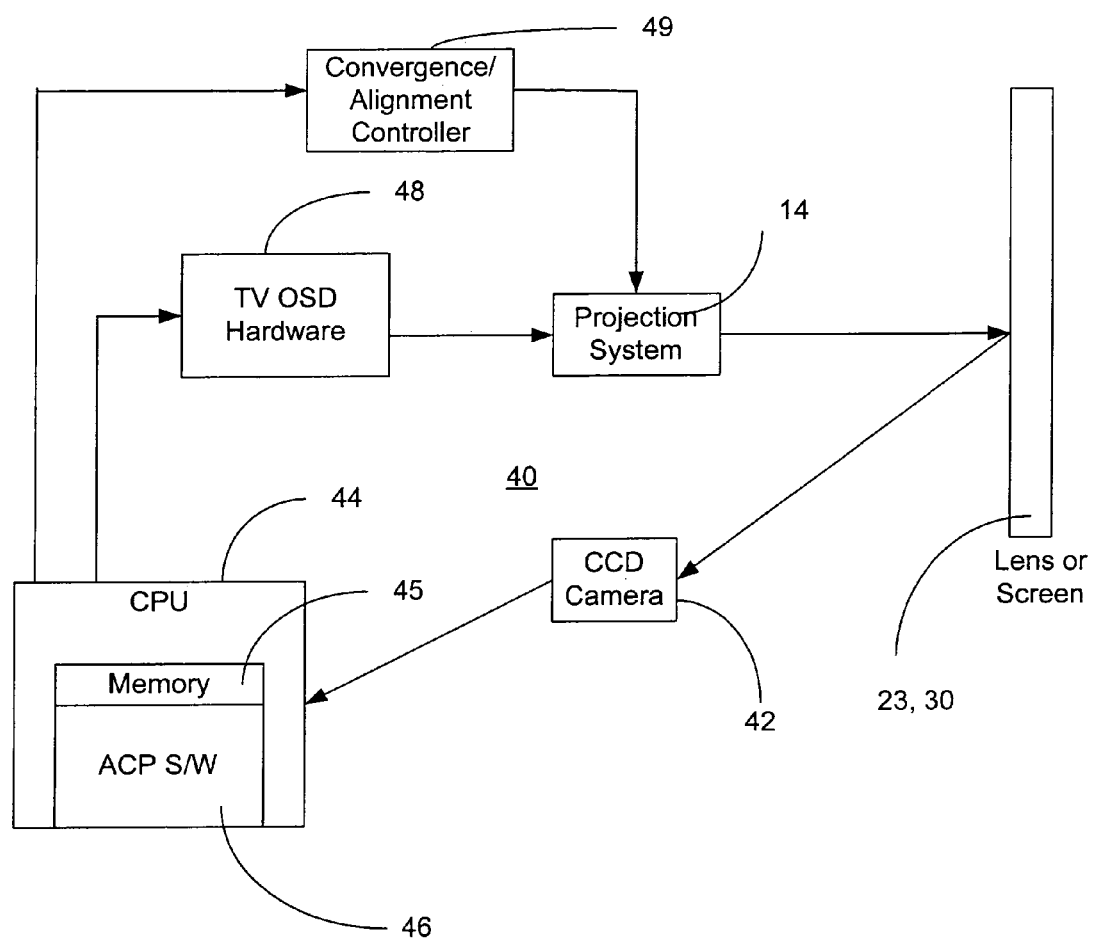
FIG. 5 depicts a schematic of the automatic convergence system of the present invention.

Referring to FIG. 5, a preferred embodiment of the automatic convergence system 40 of the present invention is shown. As depicted, the automatic convergence system 40 comprises a CCD camera 42 optically coupled to the Fresnel lens 23 or the deployable reflective sheet 30. The CCD camera 42 is also coupled to a controller, microprocessor, CPU or the like, such as the PTV's microprocessor or CPU 44 which runs the automatic convergence process (ACP) software 46. The microprocessor 44 preferably includes non-volatile memory 45 in which the ACP software 46 is stored. The microprocessor 44 uses the PTV's on screen display (OSD) controller (software and hardware) 48, which is coupled to the CRT projection system 14, to select video or test pattern display. The OSD controller generates the test patterns necessary to conduct convergence. The microprocessor 44 uses the data received from the CCD camera 42 to instruct convergence/alignment controller 49 to move align, center or steer raster patterns to compensate for convergence error at a particular location.

Figure 6:
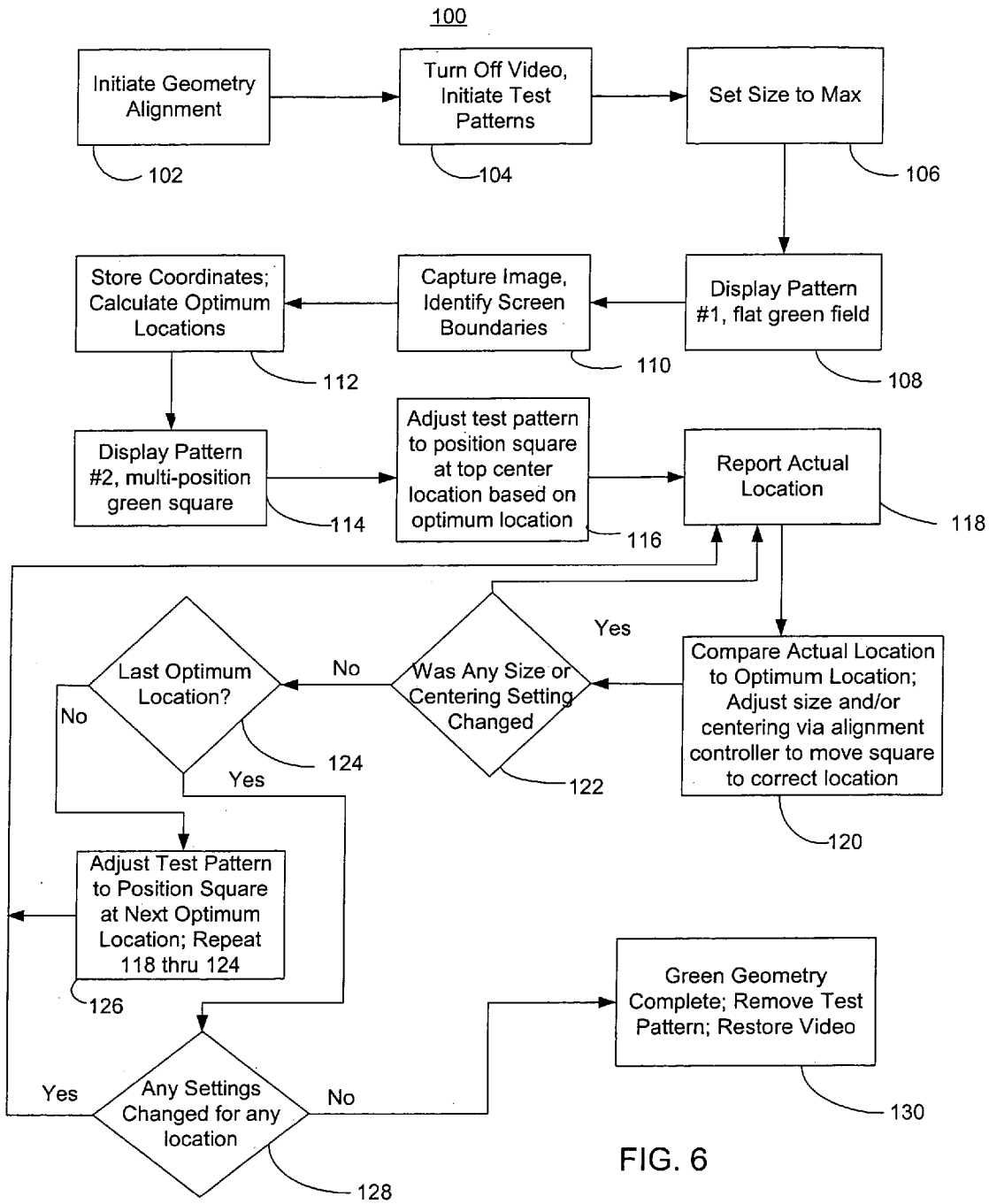
FIG. 6 depicts a flow chart illustrating a preferred embodiment of the automatic geometric alignment process of the present invention.
Figure 7:
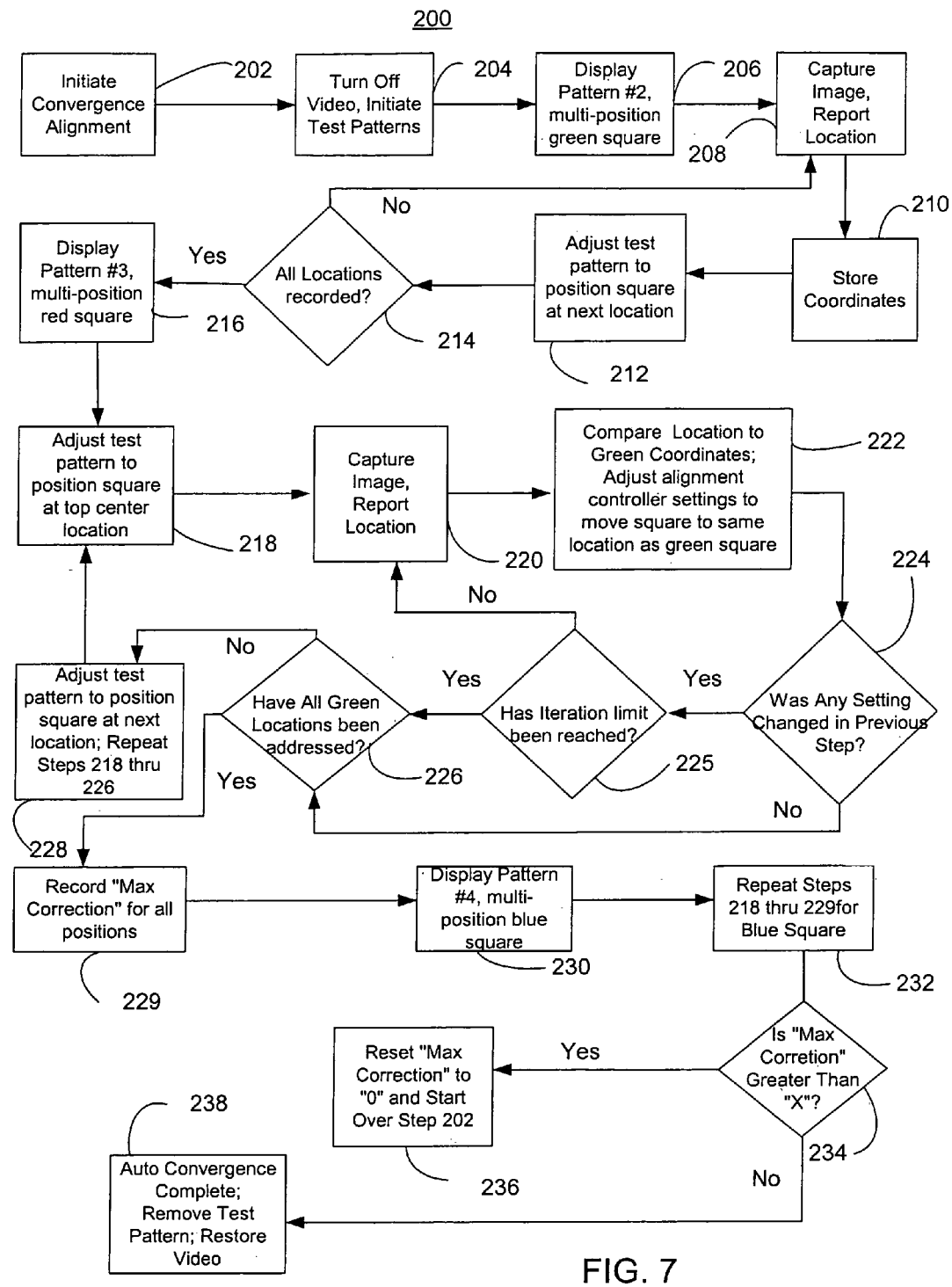
FIG. 7 depicts a flow chart illustrating another preferred embodiment of the automatic convergence process of the present invention.

The process of automatically aligning convergence and geometry in CRT projection systems in accordance with the present invention is shown in FIG. 6 (geometry mode) and FIG. 7 (align mode). In the geometry or linearity mode 100, the geometry alignment process may be initiated at step 102 manually by stepping through the menu system of the PTV, or automatically by schedule or by detection of changes known to affect convergence such as being jarred or changes in temperature or humidity. Once the geometry alignment process is initiated, the microprocessor 44 of the PTV 11, at step 104, causes the OSD controller 48 to turn off the video being projected onto the projection screen 20, if any, to initiate predetermined test patterns, and, at step 106, sets the projected image size to maximum via convergence circuitry 49 to insure that the projected test patterns are projected into the over scan area 25. At step 108, the microprocessor 44 causes the OSD controller 48 and software to display or project a first test pattern, test pattern #1, preferably a flat green field, onto the Fresnel lens 23 and the over scan area 25 of the cabinet 12. At step 110, the CCD camera 42 captures the images reflected from the Fresnel lens 23 and the cabinet 12 in the over scan area 25, and transmits this data to the microprocessor 44. The microprocessor 44 analyzes the image data, more particularly, the difference in brightness of the images reflected by the Fresnel lens 23 and the cabinet 12 in the over scan area 25, and determines the screen frame boundaries. The microprocessor 44 stores these coordinates in memory 45 and calculates the optimum locations for all predetermined geometrical test patterns at step 112.

Next, the microprocessor 44, at step 114, causes the OSD controller 48 to display or project a second test pattern, test pattern #2, preferably a multi-positional green square, onto the Fresnel lens 23. At step 116, the microprocessor 44 causes the OSD controller 48 to adjust the test pattern #2 to position the square at the theoretical top center location based on the calculated optimum location—at this point, the first calculated optimum location—on the Fresnel lens 23. Next, at step 118, the CCD camera 42 captures the reflected image of the multi-positional green square and reports the actual location of the multi-positional green square to the microprocessor 44. The microprocessor 44, at step 120, compares the actual location of the green square to the calculated optimum location, and, if different, causes the convergence/alignment controller 49 to move the green square to a correct location, i.e., the calculated optimum location. Where the projection system 14 comprises individual CRT projection units 16,17 and 18 as depicted in FIGS. 3a and 3b, the convergence controller 49 comprises convergence circuitry that is activated to move the green square. Where the projection system 14 comprises a single or multi-chip based digital projection system as depicted in FIGS. 4a and 4b, the controller 49 includes servo motors or other electromechanical positioning devices coupled to the individual chips that are driven by the microprocessor 44 to adjust the mechanical adjustment of a digital display chip to move the green square. At step 122, the microprocessor 44 determines if any size or centering setting was changed. If yes, steps 118 through 122 are repeated. If no, the microprocessor 44 moves on to step 124 where it determines whether the last location was the last of the optimum locations. If no, the microprocessor 44 moves on to step 126 where it causes the OSD controller 48 to adjust the test pattern #2 to position the green square at the next predetermined location based on the calculated optimum location and repeats steps 118 through 124 until all calculated optimum locations have been addressed. If yes at step 124, the microprocessor moves on to step 128 and determines whether any settings have been changed for pattern #2 at any of the predetermined locations (positions). If yes, the microprocessor 44 moves back to step 118 to begin another iteration to check and adjust pattern #2 at all of the optimized locations. At this point, the microprocessor 44 limits the iterations to 2 or 3 to expedite the process. Alternatively, the microprocessor 44 can determine whether the maximum correction to the settings for any and/or all of the locations falls below a predetermined level. If yes, the iterative process is complete. This iterative process is preferred because the adjustments to geometry (and alignment) are interactive in the CRTs and convergence drivers.

If, at step 128, the process has reached the limit of the number of iterations allowed or the maximum settings corrections for any and/or all location is less than a predetermined level, the green geometry alignment is complete and the microprocessor 44 moves on to step 130 where it directs the OSD controller 48 to remove the test pattern and restore the video.

Alternatively, the ACP software can be set up to instruct the microprocessor 44 to initiate the align mode convergence process 200 (FIG. 7) once step 130 of the geometry mode 100 is reached. Since the green image geometry has already been set and recorded, the microprocessor 44 can jump to steps 216–238 to align the red and blue images to converge with the green image.

Turning to FIG. 7, in the align mode 200, the convergence alignment process may be initiated, at step 202, like the geometry alignment process 100, either manually by stepping through the menu system of the PTV 11, or automatically by schedule, by detection of changes known to affect convergence such as being jarred or changes in temperature or humidity, or upon completion of the geometry mode 100. Once the alignment process is initiated, the microprocessor 44 of the PTV 11, at step 204, turns off the video being projected onto the projection screen 20, if any, to initiate predetermined test patterns via OSD controller 48. However, if the alignment mode 200 has been initiated by completion of the geometry mode 100, the microprocessor 44 preferably skip steps 204–214 and jumps to step 216 using the data stored during the geometry mode.

At step 206, the microprocessor 44 causes the OSD controller 48 to display or project a test pattern, test pattern #2, preferably a multi-positional green square, onto the Fresnel lens 23. At step 208, the CCD camera 42 captures the reflected image of the multi-positional green square and reports the actual location of the multi-positional green square to the microprocessor 44. The microprocessor 44, at step 210, stores the coordinates of this location in memory 45 and then, at step 212, causes the OSD controller 48 to change the test pattern #2 to position the green square at the next location. At step 214, the microprocessor 44 determines whether the green square location has been recorded for all predetermined locations. If no, the process is not finished in regard to test pattern #2, and steps 208 through 212 are repeated. If yes, the process is finished in regard to test pattern #2, and the microprocessor 44 moves on to step 216 where it causes the OSD controller 48 to display or project a new test pattern, test pattern #3, preferably a multi-positional red square, onto the Fresnel lens 23. At step 218, the microprocessor 44 causes the OSD controller 48 to adjust the test pattern #3 to position the red square at the theoretical top center of the green square's first stored location. At step 220, the CCD camera 42 captures the reflected image of the multi-positional red square and reports the actual location of the multi-positional red square to the microprocessor 44. The microprocessor 44, at step 222, compares the actual location of the red square to stored coordinates of the green square, and, if different, adjusts position of the projected image (pattern) to cause the convergence controller 49 to move the red square to the same coordinates or location as stored for the green square in step 210. Where the projection system 14 comprises individual CRT projection units 16, 17 and 18 as depicted in FIGS. 3a and 3b, the convergence controller 49 comprises convergence circuitry that is activated to move the green square. Where the projection system 14 comprises a multi-chip based digital projection system as depicted in FIG. 4b, the controller 49 includes servo motors or other electro-mechanical positioning devices coupled to the individual chips that are driven by the microprocessor 44 to adjust the mechanical adjustment of a digital display chip to move the green square. At step 224, the microprocessor 44 determines if any position settings were changed at step 222. If yes, steps 220 through 224 are repeated if the iteration limit has not already been met as determined at step 225. At step 225, the microprocessor 44 preferably limits the iterations to 2 or 3 to expedite the process. Alternatively, the microprocessor 44 can determine whether the maximum correction to the image position at this location falls below a predetermined level. If yes, the iterative process is complete. If the microprocessor 44 determines, at step 225, that the iteration limit has been met, or, at step 224, that no position setting was changed, the microprocessor 44 moves on to step 226 where it determines if all of the green locations have been addressed. If no, the microprocessor moves on to step 228 where it causes the OSD controller 48 to change the test pattern #3 to position the red square at the next green square location stored in memory, and then repeat steps 218 through 226. If yes at step 226, the process is finished in regard to test pattern #3, and the microprocessor 44 moves on to step 229 where it records the "maximum correction" required for any location on the screen and then on to step 230 where it causes the OSD controller 48 to display or project a new test pattern, test pattern #4, preferably a multi-positional blue square, onto the Fresnel lens 23. Next, at step 232, steps 218–229 are repeated for the blue square until all of the green square memorized locations have been addressed. Once the process is completed in regard to test pattern #4, the microprocessor 44 determines, at step 234, whether the "maximum correction" is greater than a predetermined value X. If yes, the microprocessor 44 resets the "maximum correction" to zero (0) and returns to step 202 to begin repeating steps 202 through 234. Although not required, this step tends to reduce the number times the system potentially goes through the entire process while still compensating for adjustment interaction. The value of "X" is preferably selected to be small enough to ensure that the viewer will perceive "perfect" alignment, even if the process could make it even better. If no at step 234, the automatic convergence process is complete and the microprocessor 44, at step 238, causes the OSD controller 48 to remove the test pattern and restore the video to the screen 20.

If the alternative embodiment having a deployable reflection screen, as depicted in FIG. 4, is used, the reflective screen 30 would preferably be deployed between steps 112 and 114 of the geometry and alignment mode 100, and at step 202 of the convergence alignment mode 200.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, unless otherwise stated, and the invention can be performed using different or additional process actions, or a different combination or ordering of process actions. As another example, each feature of one embodiment can be mixed and matched with other features shown in other embodiments. Features and processes known to those of ordinary skill may similarly be incorporated as desired. Additionally and obviously, features may be added or subtracted as desired. Accordingly, the invention is not to be restricted except in light of the attached claims and their equivalents.

What is claimed is:

1. A method for automatic geometric alignment in a CRT projection system comprising the steps of displaying a first image pattern onto a screen of the CRT projection system, wherein the screen includes a Fresnel lens, reflecting back a portion of the light from the first image off of the Fresnel lens, identifying the boundaries of the screen, calculating optimum locations based on screen boundary coordinates,
displaying a second image pattern,
moving the second pattern to a first optimum location,
reporting the actual location of the second image pattern,
comparing the actual location of the second image pattern with the coordinates of the first optimum location, and
aligning the second image pattern with the first optimum location.

2. The method of claim 1 wherein the first image pattern comprises a flat green field projected onto the screen and onto an over scanned area.

3. The method of claim 2 wherein the step of identifying the boundaries of the screen includes analyzing the difference in brightness of the reflected images reflected off of the screen and the over scanned area.

4. The method of claim 1 wherein aligning the second image pattern with the first calculated optimum location includes adjusting the size or centering of the second image pattern.

5. The method of claim 1 further comprising the steps of
moving the second pattern to a second optimum location,
reporting the actual location of the second image pattern,
comparing the actual location of the second image pattern with the coordinates of the second optimum location, and
adjusting the position of the second image pattern to align the second image pattern with the first calculated optimum location.

6. The method of claim 1 wherein the step of calculating optimum locations based on screen boundary coordinates includes calculating n optimum locations and further comprising the steps of
moving the second pattern to n optimum locations,
reporting the actual location of the second image pattern at each of the n optimum locations,
comparing the actual location of the second image pattern at each of the n optimum locations with the coordinates of each of the n optimum locations, and
aligning the second image pattern at each of the n optimum locations with the each of the n optimum locations.

7. A method for automatic convergence alignment in a CRT projection system comprising the steps of
displaying a first image pattern a first location on a screen comprising a Fresnel lens,
reflecting back a portion of the light from the first image off of the Fresnel lens,
identifying and storing the coordinates of the first location of the first image pattern,
moving the first image pattern to a second location,
identifying and storing the coordinates of the second location of the first image pattern,
displaying a second image pattern,
adjusting the second image pattern to move the second image pattern to the top center of the first location of the first image pattern,
reporting the actual location of the second image pattern,
comparing the actual location of the second image pattern with the coordinates of the first location of the first image pattern, and
aligning the second image pattern with the first location of the first image pattern.

8. The method of claim 7 further comprising steps of
moving the second image pattern to a second location,
adjusting the second image pattern to move the second image pattern to the top center of the second location of the first image pattern,
reporting the actual location of the second image pattern,
comparing the actual location of the second image pattern with the coordinates of the second location of the first image pattern, and
aligning the second image pattern with the second location of the first image pattern.

9. The method of claim 8 further comprising the steps of
displaying a third image pattern,
adjusting the third image pattern to move the third image pattern to the top center of the first location of the first image pattern,
reporting the actual location of the third image pattern,
comparing the actual location of the third image pattern with the coordinates of the first location of the first image pattern, and
aligning the third image pattern with the first location of the first image pattern.

10. The method of claim 9 further comprising steps of
moving the third image pattern to a second location,
adjusting the third image pattern to move the third image pattern to the top center of the second location of the first image pattern,
reporting the actual location of the third image pattern,
comparing the actual location of the third image pattern with the coordinates of the second location of the first image pattern, and
aligning the third image pattern with the second location of the first image pattern.

11. The method of claim 10 wherein the first, second and third image patterns comprise a movable monochromatic geometric shape.

12. The method of claim 8 further comprising the steps of
moving the first image pattern to n locations,
identifying and storing the coordinates of the first image pattern at each of the n locations,
moving the second image pattern to each of the n locations,
adjusting the second image pattern to move the second image pattern to the top center of each of the n locations of the first image pattern,
reporting the actual location of the second image pattern at each of the n locations,
comparing the actual location of the second image pattern at each of the n locations with the coordinates of the first image pattern at each of the n locations, and
aligning the second image pattern at each of the n locations with each of the n locations of the first image pattern.

* * * * *